United States Patent Office 3,324,152
Patented June 6, 1967

3,324,152
1α-METHYL-Δ²-ANDROSTENES
Hans Müller and Rudolf Wiechert, Berlin, Germany, assignors to Schering AG, Berlin, Germany
No Drawing. Filed Feb. 12, 1964, Ser. No. 344,191
Claims priority, application Germany, Apr. 18, 1963, Sch 33,126
16 Claims. (Cl. 260—397.5)

The present invention relates to 1α-methyl-Δ²-androstenes, and more particularly to 1α-methyl-Δ²-androstene-17β-ol compounds and derivatives thereof, and to the method of production of such compounds.

It is a primary object of the present invention to provide a new series of compounds, namely 1α-methyl-Δ²-5α-androstene-17β-ol compounds.

It is another object of the present invention to provide a method of producing such compounds.

It is yet another object of the present invention to provide a new series of compounds which have a highly effective anabolic action, and which can be administered orally to achieve such action.

It is still a further object of the present invention to provide such compounds which while having a strong anabolic action have substantially no androgenic side effect.

Other objects and advantages of the present invention will be apparent from a further reading of the specification and of the appended claims.

With the above and other objects in view, the present invention mainly comprises a compound of the formula:

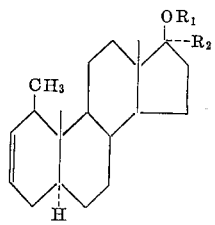

wherein R₁ is selected from the group consisting of hydrogen and acyl, acyl being preferably derived from a lower aliphatic carboxylic acid, and wherein R₂ is selected from the group consisting of hydrogen and lower alkyl, wherein the alkyl can be either saturated or unsaturated.

In accordance with the method of the present invention, 1α-methyl-5α-androstane-17β-ol-3-one-17-ester is, in per se known manner, preferably using sodium borohydride, first reduced to a mixture of the two corresponding epimers of 1α-methyl-5α-androstane-3,17β-diol-17-ester. This mixture is then, also in per se known manner, tosylated, and the crude tosylated reaction product filtered over neutral aluminum oxide, whereby a 17-ester of 1α-methyl-Δ²-5α-androstene-17β-ol is obtained. This compound is then, depending on the desired value for R₁ in the final product, saponified to the free 1α-methyl-Δ²-5α-androstene-17β-ol, whereupon the latter can, if desired, by the use of the desired acid of the formula R₁OH or a reactable acid derivative, again esterified.

It is desired that R₂ in the final product be an alkyl, the free 1α-methyl-Δ²-5α-androstene-17β-ol is, in per se known manner, preferably by means of chromic acid, oxidized to 1α-methyl-Δ²-5α-androstene-17-one, and this compound is then, also in per se known manner, either by means of Grignardation converted to a 17α-position alkyl group, or an analogously introduced 17α-ethinyl group is subsequently reduced to a vinyl or ethyl group. The 17β-position hydroxyl group can then be subsequently esterified with the desired acyl.

The method of the present invention proceeds in accordance with the following reaction mechanism:

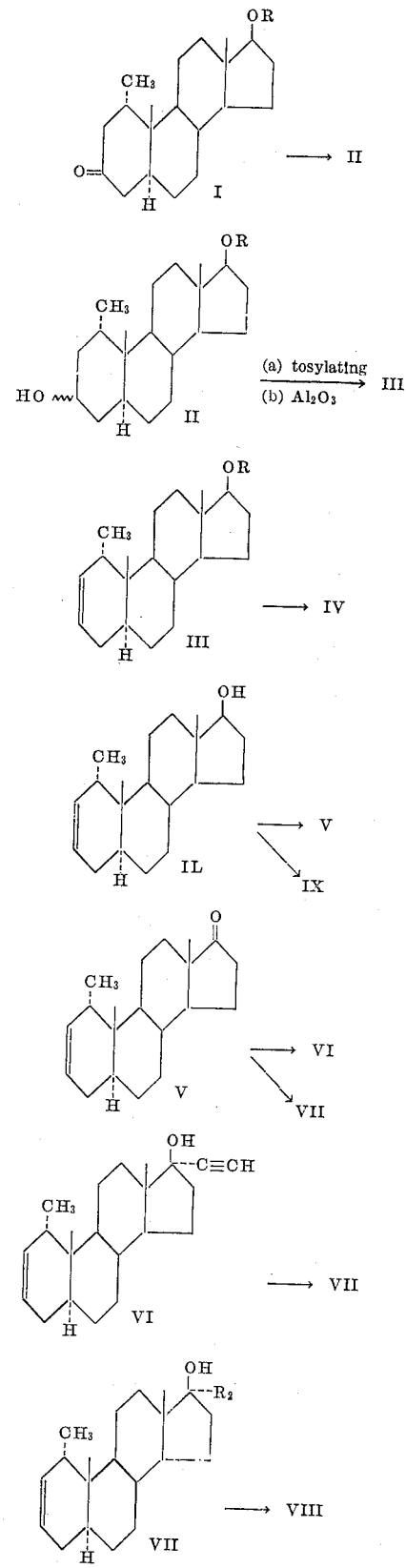

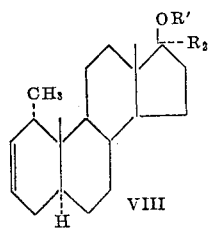

VIII

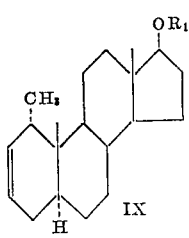

IX

In the above formulas R is acyl, $R_1$ is hydrogen or acyl, and $R_2$ is a lower saturated or unsaturated alkyl.

The new compounds of the present invention can be administered orally to give a strong anabolic action, and even at very high doses the androgenic side effect is practically negligible.

Thus, for example, the $1\alpha,17\alpha$-dimethyl-$\Delta^2$-$5\alpha$-androstene-$17\beta$-ol in the levator-ani test on castrated rats is anabolically three times as active as the $17\alpha$-methyl-testosterone with which it is compared. Even at higher doses, the androgenic side effect is only about ⅙ that of the $17\alpha$-methyl-testosterone.

The great separation and action between the anabolic and androgenic activity is extremely advantageous.

$1\alpha$-methyl-$\Delta^2$-$5\alpha$-androstene-$17\beta$-ol is also in suitable doses upon per oral administration anabolically equally as strong as $17\alpha$-methyl-testosterone and at the same time however exhibits no androgenic side effect. $1\alpha$-methyl-$\Delta^2$-$5\alpha$-androstene-$17\beta$-ol also proves to be practically equal with respect to anabolic and androgenic activity upon per oral administration as $1$-methyl-$\Delta^1$-androstene-$17\beta$-ol-$3$-one.

The compound $1\alpha$-methyl-$17\alpha$-ethinyl-$\Delta^2$-$5\alpha$-androstene-$17\beta$-ol exhibits in particular the ability to inhibit the gonadotropin-elimination, since after its administration an elimination action on the growth of the testes and prostate can be noticed. In addition, ovulation inhibition after subcutaneous administration is observed.

In comparison to the new $1\alpha$-methyl compounds of the present invention, the corresponding $1\alpha$-desmethyl compounds (compare Chem. and Ind. 1961, page 1962 and U.S. Patent No. 2,996,524) besides exhibiting a strong anabolic action at the same time exhibit an undesired strong androgenic side effect.

The following examples are given to further illustrate the present invention. The scope of the invention is not, however, meant to be limited to the specific details of the examples.

*Example 1*

1.97 g. of $NaBH_4$ are introduced in small portions at room temperature under stirring to a solution of 15 g. of $1\alpha$-methyl-androstane-$17\beta$-ol-$3$-one-$17$-acetate (produced according to German Patent No. 1,122,944, German Auslegeschrift No. 1,131,667) in 650 cc. of methanol and 31.6 cc. of water. After the introduction is completed, the reaction mixture is stirred for an additional 20 minutes, and the reaction mixture is then poured into ice cold sodium chloride solution. The resulting precipitate is filtered off, washed until neutral, and while still wet taken up in methylene chloride. The methylene chloride phase is dried and evaporated. There remains a crystallisate which melts at 138° C. and a mixture of 3α- and 3β-hydroxy compound. The yield is practcially quantita-tive. Upon thin layer chromatogram it is shown that the starting compound, the 3-ketone, is no longer present.

15 g. of the epimer mixture, 15 g. of p-toluene sulfochloride and 22.5 cc. of absolute pyridine are allowed to stand overnight at room temperature. The reaction mixture is then stirred into 1 liter of sodium bicarbonate solution. The precipitate is filtered off, dissolved in methylene chloride, washed to neutral, dried and evaporated.

There remains $1\alpha$-methyl-$5\alpha$-androstane-$3\beta,17\beta$-diol-$3$-tosylate-$17$-acetate as a crystallizable oil in practically quantitative yield.

The crude product (approximately 18 g.) is dissolved in benzene and introduced into a column with 1 kg. of aluminum oxide (neutral, 1% water content). By eluation with benzene with increasing amounts of ethyl acetate, 9.1 g. of $1\alpha$-methyl-$\Delta^2$-$5\alpha$-androstene-$17\beta$-ol-$17$-acetate is obtained as an oil, which recrystallizes from pentane, melting at 52–53° C.

*Example 2*

9.1 g. of the $1\alpha$-methyl-$\Delta^2$-$5\alpha$-androstene-$17\beta$-ol-$17$-acetate produced according to Example 1, in 106 cc. of methanol are heated under nitrogen and refluxing with 10.5 g. of potassium carbonate in 27 cc. of water. The heating is for 90 minutes. 10.5 cc. of glacial acetic acid are then added. The reaction mixture is cooled and diluted with water. The precipitate is filtered off under suction, washed until neutral and dissolved in methylene chloride. The methylene chloride phase is dried over sodium sulfate and evaporated. The residue consists of $1\alpha$-methyl-$\Delta^2$-$5\alpha$-androstene-$17\beta$-ol, which recrystallizes from isopropyl ether and melts at 124–125° C. The yield amounts to 6.45 g.

*Example 3*

2.5 g. of the $1\alpha$-methyl-$\Delta^2$-$5\alpha$-androstene-$17\beta$-ol produced according to Example 2 are heated for 1.5 hours at 125° C. with 10 cc. of absolute pyridine and 5 cc. of enanthic acid anhydride. 0.2 cc. of water are then added and the reaction mixture is then heated for 1 hour at 100° C. Pyridine and excess enanthic acid anhydride are subsequently distilled off with steam. The reaction product is extracted with methylene chloride. The methylene chloride phase is dried over sodium sulfate and evaporated.

There is thus obtained 2.33 g. of $1\alpha$-methyl-$\Delta^2$-$5\alpha$-androstene-$17\beta$-ol-$17$-enanthate as an oil.

*Example 4*

2.5 g. of the $1\alpha$-methyl-$\Delta^2$-$5\alpha$-androstene-$17\beta$-ol produced according to Example 2 are dissolved in 65 cc. of acetone, the solution is cooled to 15° C., and 660 mg. of chromium-(VI)-oxide in 2.2 cc. of 8 N sulfuric acid are added dropwise under stirring to the cooled solution. The stirring is continued for an additional 2 minutes and the reaction solution is then poured into ice water, extracted with methylene chloride, the methylene chloride phase is washed successively with sodium thiosulfate solution, then sodium bicarbonate solution, then water, dried over sodium sulfate and then evaporated. What remains is an oil ($1\alpha$-methyl-$\Delta^2$-$5\alpha$-androstene-17-one) which serves as a crude product for Grignardation. The yield amounts to 2.5 g.

2.4 g. of crude $1\alpha$-methyl-$\Delta^2$-$5\alpha$-androstene-17-one in 120 cc. of absolute benzene are added dropwise to cooled Grignard solution, produced from 3.52 g. of magnesium turnings in 39 cc. of absolute ether and 9.04 cc. of methyl iodide in 25 cc. of absolute ether, and the reaction mixture stirred for 4 hours at room temperature under nitrogen. Thereupon concentrated aqueous ammonium chloride solution is very carefully added under cooling from the outside with ice. The reaction mixture is acidified with dilute hydrochloric acid and extracted with ether. The ethereal phase is washed neutral, dried and evaporated. The residue is subjected to chromatography over silica gel (10% water content). By elution with equal portions of carbon tetrachloride and methylene chloride and recrystallization from methanol there is obtained 1.51 g. of 1α,17α-dimethyl-Δ²-5α-androstene-17β-ol having a melting point of 76–78° C.

*Example 5*

Cooled Grignard reagent prepared from 468 mg. of magnesium turnings in 4.8 cc. of absolute tetrahydrofurane and 1.45 cc. of ethyl bromide in 4.8 cc. of absolute tetrahydrofurane are added to 7 cc. of absolute tetrahydrofurane through which acetylene had previously been conducted for 20 minutes. This results in an increase in the temperature to 45° C. Acetylene is then again conducted therethrough until the temperature again falls.

Thereupon 225 mg. of the crude 1α-methyl-Δ²-5α-androstene-17-one, produced according to Example 4, in 4.8 cc. of absolute tetrahydrofurane are added dropwise to the reaction mixture. During the dropwise addition acetylene is always still conducted through the reaction mixture. The reaction mixture is then heated under nitrogen and stirring for 21 hours at 70° C. on a hot oil bath. After cooling to 5° C., concentrated aqueous ammonium chloride solution are slowly added until no reaction occurs. It is then extracted with ether, the organic phase washed with water until neutral, dried over sodium sulfate, concentrated to dryness under vacuum and the residue is subjected to chromatography over silica gel (10% water content).

After elution with equal parts of carbon tetrachloride and methylene chloride, and recrystallization from pentane there is obtained 100 mg. of 1α-methyl-17α-ethinyl-Δ²-5α-androstene-17β-ol having a melting point of 92–93° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 1α-methyl-Δ²-5α-androstene-17β-ol.
2. 1α-methyl-Δ²-5α-androstene-17β-ol-17-acylate wherein the acyl is derived from a hydrocarbon carboxylic acid.
3. A compound of the formula:

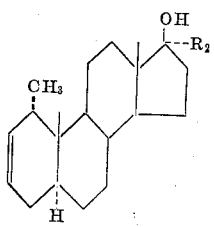

wherein R₂ is lower alkyl.

4. A compound of the formula:

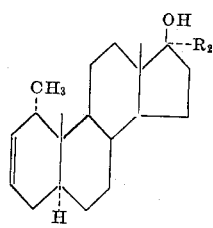

wherein R₂ is lower alkinyl.

5. A compound of the formula:

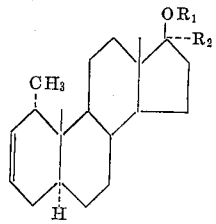

wherein $R_1$ is an acyl derived from a hydrocarbon carboxylic acid; and wherein $R_2$ is a hydrocarbon radical selected from the group consisting of alkyl and alkinyl radicals of up to 5 carbon atoms.

6. 1α-methyl-Δ²-5α-androstene-17β-ol-17-acetate.
7. 1α-methyl-Δ²-5α-androstene-17β-ol-17-enanthate.
8. 1α,17α-dimethyl-Δ²-5α-androstene-17β-ol.
9. 1α-methyl-17α-ethinyl-Δ²-5α-androstene-17β-ol.
10. 1α-methyl-17α-ethyl-Δ²-5α-androstene-17β-ol.
11. The method which comprises reducing 1α-methyl-5α-androstane-17β-ol-3-one-17-acylate to the corresponding epimers of 1α-methyl-5α-androstane-3,17β-diol-17-acylate; tosylating said epimers so as to form the corresponding 1α-methyl-5α-androstane-3,17β-diol-3-tosylate-17-acylate; and filtering the thus-obtained crude tosylated reaction product in an organic solvent through neutral aluminum oxide to obtain thus purified 1α-methyl-Δ²-5α-androstene-17β-ol-17-acylate.
12. The method which comprises reducing 1α-methyl-5α-androstane-17β-ol-3-one-17-acylate to the corresponding epimers 1α-methyl-5α-androstane-3,17β-diol-17-acylate; tosylating said epimers so as to form the corresponding 1α-methyl-5α-androstane-3,17β-diol-3-tolylate-17-acylate; filtering the thus-obtained crude tosylated reaction product in an organic solvent through neutral aluminum oxide to obtain thus purified 1α-methyl-Δ²-5α-androstene-17β-ol-17-acylate; and saponifying the thus formed 1α-methyl-Δ²-5α-androstene-17β-ol-17-acylate so as to form the corresponding 1α-methyl-Δ²-5α-androstene-17β-ol.
13. The method which comprises reducing 1α-methyl-5α-androstane-17β-ol-3-one-17-acylate to the corresponding epimers 1α-methyl-5α-androstane-3,17β-diol-17-acylate; tosylating said epimers so as to form the corresponding 1α-methyl-5α-androstane-3,17β-diol-3-tolylate-17-acylate; filtering the thus-obtained crude tosylated reaction product in an organic solvent through neutral aluminum oxide to obtain thus purified 1α-methyl-Δ²-5α-androstene-17β-ol-17-acylate; saponifying the thus formed 1α-methyl-Δ²-5α-androstene-17β-ol-17-acylate so as to form the corresponding 1α-methyl-Δ²-5α-androstene-17β-ol; oxidizing the same to the corresponding 1α-methyl-Δ²-5α-androstene-17-one; and converting said 1α-methyl-Δ²-5α-androstene-17-one to the corresponding 1α-methyl-17α-loweralkyl-Δ²-5α-androstene-17β-ol by Grignardation.
14. The method which comprises reducing 1α-methyl-5α-androstane-17β-ol-3-one-17-acylate to the corresponding epimers 1α-methyl-5α-androstane-3,17β-diol-17-acylate; tosylating said epimers so as to form the corresponding 1α-methyl-5α-androstane-3,17β-diol-3-tolylate-17-acylate; filtering the thus-obtained crude tosylated reaction product in an organic solvent through neutral aluminum oxide to obtain thus purified 1α-methyl-Δ²-5α-androstene-17β-ol-17-acylate; saponifying the thus formed 1α-methyl-Δ²-5α-androstene-17β-ol-17-acylate so as to form the corresponding 1α-methyl-Δ²-5α-androstene-17-ol; oxidizing the same to the corresponding 1α-methyl-Δ²-5α-androstene-17-one; converting said 1α-methyl-Δ²-5α-androstene-17-one to the corresponding 1α-methyl-17α-loweralkinyl-Δ²-5α-androstene-17β-ol by Grignardation; and reducing said 1α-methyl-17α-loweralkinyl-Δ²-5α-androstene-17β-ol to the corresponding 1α-methyl-17α-loweralkenyl-Δ²-5α-androstene-17β-ol.

15. The method which comprises reducing 1α-methyl-5α-androstane-17β-ol-3-one-17-acylate to the corresponding epimers 1α-methyl-5α-androstane-3-17β-diol-17-acylate; tosylating said epimers so as to form the corresponding 1α-methyl-5α-androstane-3,17β-diol-3-tolylate-17-acylate; filtering the thus-obtained crude tosylated reaction product in an organic solvent through neutral aluminum oxide to obtain thus purified 1α-methyl-Δ$^2$-5α-androstene-17β-ol-17-acylate; saponifying the thus formed 1α-methyl-Δ$^2$-5α-androstene-17β-ol-17-acylate so as to form the corresponding 1α-methyl-Δ$^2$-5α-androstene-17-ol; oxidizing the same to the corresponding 1α-methyl-Δ$^2$-5α-androstene-17-one; and converting said 1α-methyl-Δ$^2$-5α-androstene-17-one to the corresponding 1α-methyl-17α-lower-alkinyl-Δ$^2$-5α-androstene-17β-ol by Grignardation.

16. The method which comprises reducing 1α-methyl-5α-androstane-17β-ol-3-one-17-acylate to the corresponding epimers 1α-methyl-5α-androstane-3,17β-diol-17-acylate; tosylating said epimers so as to form the corresponding 1α-methyl-5α-androstane-3,17β-diol-3-tosylate-17-acylate; filtering the thus-obtained crude tosylated reaction product in an organic solvent through neutral aluminum oxide to obtain thus purified 1α-methyl-Δ$^2$-5α-androstene-17β-ol-17-acylate; saponifying the thus formed 1α-methyl-Δ$^2$-5α-androstene-17β-ol-17-acylate so as to form the corresponding 1α-methyl-Δ$^2$-5α-androstene-17β-ol; oxidizing the same to the corresponding 1α-methyl-Δ$^2$-5α-androstene-17-one; subjecting said 1α-methyl-Δ$^2$-5α-androstene-17-one to Grignardation so as to form the corresponding 17β-hydroxyl-17α-lower hydrocarbon derivative; and esterifying the same so as to form the corresponding 17β-acylate.

References Cited
UNITED STATES PATENTS

| | | | |
|---|---|---|---|
| 2,996,524 | 8/1961 | Huffman | 260—397.5 |
| 3,009,934 | 11/1961 | Counsell et al. | 260—397.4 |
| 3,018,298 | 1/1962 | Klimstra et al. | 260—397.4 |
| 3,167,547 | 1/1965 | Cross | 260—239.55 |

LEWIS GOTTS, *Primary Examiner.*

ELBERT L. ROBERTS, *Examiner.*